United States Patent [19]

Taylor et al.

[11] 4,256,851
[45] Mar. 17, 1981

[54] DEGRADABLE PLASTIC COMPOSITION CONTAINING UNSATURATED ALCOHOL OR ESTER THEREOF

[75] Inventors: Lynn J. Taylor, Toledo; John W. Tobias, Perrysburg, both of Ohio

[73] Assignee: Owens-Illinois, Inc., Toledo, Ohio

[21] Appl. No.: 870,690

[22] Filed: Jan. 19, 1978

Related U.S. Application Data

[63] Continuation-in-part of Ser. No. 865,046, Dec. 12, 1977, which is a continuation of Ser. No. 731,486, Oct. 12, 1976, abandoned, which is a continuation of Ser. No. 288,750, Sep. 13, 1972, abandoned.

[51] Int. Cl.³ .......................... C08J 9/04; C08K 5/05; C08K 5/10
[52] U.S. Cl. .......................................... 525/1; 521/82; 521/95; 521/97; 521/916; 260/DIG. 43; 525/5; 525/298; 525/306
[58] Field of Search .................. 260/2.5 H, DIG. 43; 526/1; 528/495; 525/5, 1, 306, 298; 521/82, 95, 97, DIG. 916

[56] References Cited

U.S. PATENT DOCUMENTS

| | | | |
|---|---|---|---|
| 3,575,904 | 4/1970 | Clarke et al. | 260/DIG. 43 |
| 3,679,777 | 7/1972 | Lambert | 526/1 |
| 3,839,311 | 10/1974 | Guillory et al. | 526/1 |
| 3,852,227 | 12/1974 | Matsuda et al. | 526/1 |
| 3,915,912 | 10/1975 | Ishicawa et al. | 260/18 N |
| 3,935,141 | 1/1976 | Potts et al. | 260/DIG. 43 |
| 4,101,720 | 7/1978 | Taylor et al. | 526/1 |

OTHER PUBLICATIONS

Concise Chemical and Technical Dictionary, 1974.

*Primary Examiner*—John Kight, III
*Attorney, Agent, or Firm*—Charles S. Lynch; Myron E. Click; David H. Wilson

[57] ABSTRACT

There is disclosed an environmentally degradable plastic composition comprising an organic polymeric material having dispersed therein at least one ethylenically unsaturated alcohol or ethylenically unsaturated ester derived therefrom as a readily autoxidizable organic substance.

35 Claims, 4 Drawing Figures

DEGRADABLE PLASTIC COMPOSITION CONTAINING UNSATURATED ALCOHOL OR ESTER THEREOF

RELATED APPLICATIONS

This is a continuation-in-part of copending U.S. patent application Ser. No. 865,046, filed Dec. 12, 1977, which is a continuation of previously copending and now abandoned U.S. patent application Ser. No. 731,486, filed Oct. 12, 1976, which is a continuation of previously copending and now abandoned U.S. patent application Ser. No. 288,750, filed Sept. 13, 1972.

BACKGROUND OF THE INVENTION

This invention relates to novel plastic compositions having useful physical properties and enhanced environmental degradability.

The advent of plastics has introduced improved methods of packaging goods. For example, polyethylene and polypropylene films, bags, and bottles, and polystyrene foam cups have the advantages of being chemically resistant, mechanically tough, light in weight, and inexpensive. However, the increasing use of plastics in packaging has led to the appearance of such materials in litter. While littered plastic articles are no more objectionable than littered articles of other materials, such as paper objects and metal cans, it has been suggested that the impact of plastic litter can be minimized by the development of plastic materials capable of undergoing chemical degradation upon exposure to the natural environment.

Several approaches to the enhancement of the environmental degradability of plastics have been suggested. These include: (1) the incorporation of particulate biodegradable materials such as starch as "fillers"; (2) the introduction of photodegradation-sensitizing groups into the molecular structure of a polymer by copolymerization of a common monomer with a second monomer processing such groups; and, (3) the incorporation of small amounts of selected additives which accelerate oxidative and/or photo-oxidative degradation. The last approach is particularly attractive for the following reasons. First, the physical properties of the additive-containing composition are extremely similar to those of the base polymer. Second, existing compounding and fabrication processes and equipment can be utilized in the manufacture of finished products; hence, the cost of the finished product should be relatively low. Third, the sensitivity of the composition to environmental degradation can be controlled by proper selection of the type and concentration of additive(s).

The enhancement of the rate of environmental deterioration of plastics through the use of oxidation-promoting additives is known in the prior art. For example, the preparation of degradable polyolefin films containing certain organic derivatives of transition metals is described in U.S. Pat. No. 3,454,510.

While transition metal compounds are effective accelerators of oxidative and photo-oxidative degradation processes, the use of such materials in the preparation of useful plastic compositions having enhanced degradability suffers from several limitations. The high reactivity of plastic compositions containing transition metal compounds leads to rapid degradation during high temperature extrusion and molding processes, with the result that such processes are difficult to control and tend to produce materials having poor mechanical and chemical properties. Some transition metal compounds impart undesired coloration to plastic compositions into which they are incorporated. Furthermore, the toxicity of some transition metal compounds limits their utility as additives in compositions intended for food packaging.

In accordance with this invention, the reactivity of an organic polymer toward oxidative and/or photo-oxidative degradation is significantly enhanced by the incorporation of at least one readily autoxidizable ethylenically unsaturated alcohol or ethylenically unsaturated ester derived therefrom.

The mechanism by which the addition of the readily autoxidizable alcohol (or ester) enhances the susceptibility of the base polymer to environmental degradation has not been established in detail. However, it is believed that thermal or photochemical autoxidation converts the substance to an intermediate such as a hydroperoxide which subsequently undergoes thermal or photochemical decomposition to free radicals; such radicals then initiate autoxidation of the polymer.

DESCRIPTION OF THE INVENTION

In accordance with this invention, an oxidatively degradable plastic composition is prepared by the admixture of an organic polymeric material and at least one ethylenically unsaturated alcohol (or ethylenically unsaturated ester derived from the alcohol) as a readily autoxidizable organic substance.

Typical organic polymeric materials contemplated include synthetic organic polymers (and copolymers) especially polyethylene, polypropylene, poly(1-butene), poly(4-methyl-1-pentene), ethylene-propylene copolymers, ethylene-1-butene copolymer, ethylene-1-hexene copolymers, ethylene-vinyl acetate copolymers, ethylene-ethyl acrylate copolymers, ethylene-acrylic acid copolymers and their salts, polystyrene, rubber-modified polystyrene, styrene-butadiene copolymers, styrene-isoprene copolymers, polyvinyl chloride, poly(vinylidene chloride), polyvinyl fluoride, poly(vinylidene fluoride), polyoxymethylene, poly(ethylene oxide), poly(propylene oxide), polyvinyl alcohol, polyvinyl acetate, polyvinyl formal, polyvinyl butyral, poly (methyl acrylate), poly(ethyl acrylate), poly(caprolactam), poly(hexamethyleneadipamide), poly(ethylene terephthalate), vinyl choride-vinyl acetate copolymers, cellulose acetate, cellulose propionate, cellulose acetate butyrate, ethyl cellulose, methyl cellulose, hydroxyethyl cellulose, hydroxypropyl cellulose, acrylonitrile polymers and copolymers, and methacrylonitrile polymers and copolymers. Preferred polymers include organic hydrocarbon polymers such as polyethylene, polypropylene, poly (4-methyl-1-pentene), and polystyrene.

The phrase "readily autoxidizable substance," as used herein, may be defined as an ethylenically unsaturated alcohol or ester thereof which reacts with gaseous oxygen at a reaction rate more rapid than the corresponding reaction, under comparable conditions, of gaseous oxygen with an equal weight of the additive-free polymer into which the readily autoxidizable alcohol or ester is to be combined. Such reaction rates may be compared by the volumetric measurement of the rate of absorption of gaseous oxygen by separate pure samples of the autoxidizable substance and the polymer, under conditions of constant temperature and constant oxygen pressure.

In general, readily autoxidizable unsaturated alcohols (and esters thereof) will be those whose structure contains at least one carbon-hydrogen bond which is activated, with respect to hydrogen-atom abstraction, by an adjacent carbon-carbon double bond.

Specific examples of such readily autoxidizable unsaturated alcohols (and esters derived therefrom) include aliphatic, cycloaliphatic, heterocyclic, or aromatic alcohols (and esters thereof) such as geraniol and esters derived therefrom; linalool and esters derived therefrom; citronellol and esters derived therefrom; also allyl alcohol and esters derived therefrom; crotyl alcohol and esters derived therefrom; methallyl alcohol and esters derived therefrom; farnesol and esters derived therefrom; furfuryl alcohol and esters derived therefrom; oleyl alcohol and esters derived therefrom; and ω-undecylenyl alcohol and esters derived therefrom.

Examples of specific esters include; geranyl acetate; geranyl formate; geranyl propionate; linalyl acetate; linalyl formate; linalyl propionate; and furfuryl acetate.

The novel plastic compositions of this invention are prepared by a number of methods. A preferred method consists essentially of heating the polymer at a temperature below its decomposition temperature, incorporating the autoxidizable substance, and mixing the ingredients so as to obtain a substantially uniform mixture. The mixture can then be molded and cooled to form a solid molded article. In the alternative, the mixture can be extruded and cooled to form a solid extrudate. Conventional plastic processing equipment can be used for melting the polymer, mixing the polymer with the substance(s) and molding or extruding the resulting mixture. Processing conditions, such as temperature, time, and pressure, will be obvious to those skilled in the art.

Another preferred process for preparing the novel plastic compositions of this invention consists essentially of blending the autoxidizable substance with a solid polymer to obtain a substantially uniform mixture. The polymer is preferably in the form of pellets, granules or powder. Conventional plastic processing equipment can be used in the blending operation. The processing conditions will be obvious to those skilled in the art. The resulting mixture can be melted at a temperature below the decomposition temperature of the polymer and additive(s). The resulting melt can be extruded or molded and cooled to form a solid extrudate or molded article.

A preferred process for preparing the novel plastic compositions of this invention consists essentially of casting a film from a composition of the autoxidizable substance and polymer in an inert solvent or dispersant. By "inert solvent" is meant that the solvent does not react with the polymer or autoxidizable substance. Use of this method is particularly attractive for preparing degradable coating or adhesive materials.

The autoxidizable substance can also be applied as a solution, slurry, or paste to the surface of a plastic article. Such surface application can comprise brushing, roller coating, spraying, dipping or printing (i.e., uniformly or image-wise) on the surface of the article, in the presence or absence of a solvent. If desired, the treated article can then be heated to promote diffusion of the autoxidizable substance into the polymer.

The novel plastic compositions of this invention can be prepared at the time of disposal of conventional plastic articles. For example, a plastic article can be crushed, milled or ground, and subsequently or simultaneously mixed with the autoxidizable substance. In the practice of this specific embodiment, the use of readily autoxidizable waste materials, such as wastes generated during food processing, as degradation-promoting additives is contemplated.

In one preferred processing embodiment of the present invention, a degradable plastic composition consisting of an organic polymer and the readily autoxidizable substance is prepared and shaped by conventional means. The resulting film, sheet, fiber, tube or molded article is subsequently treated in such a manner as to convert the plastic, via controlled partial oxidation, to a more readily degradable composition. This treatment may be carried out by any of several methods, including exposure to ultraviolet or ionizing radiation, heating in air or oxygen, surface treatment with a flame or electrical discharge, immersion in solutions of oxidizing agents, etc. In certain cases, it may be possible to combine high temperature processing and controlled partial oxidation into a single step; an example would be extrusion of an oxidatively degradable plastic composition into an oxygen atmosphere.

In another preferred embodiment of the present invention, a cellular degradable thermoplastic material is formed from a composition containing a polymer, the readily autoxidizable substance, and a blowing agent. The blowing agent is a substance which releases a substantial volume of gas under appropriate conditions, either by chemical decomposition to gaseous products (chemical blowing agents) or by physical vaporization (physical blowing agents). Suitable chemical blowing agents include azodicarbonamide, azobisisobutyronitrile, 4,4'-oxybis (benzene sulfonyl hydrazide), and sodium bicarbonate. Suitable physical blowing agents include nitrogen, carbon dioxide, trichlorofluoromethane and dichlorodifluoromethane. As an example, a cellular (foamed) degradable plastic material may be prepared by melting and extruding a mixture of a polyolefin, the readily autoxidizable material, and a physical blowing agent. Processing conditions similar to those employed for the fabrication of extruded polyolefin foams lacking the autoxidizable substance may be used. If desired, a degradable composite may be prepared by co-extruding a cellular degradable plastic material with a non-cellular composition of the same or a different polymer. The latter non-cellular layer may also be modified by the incorporation of the readily autoxidizable substance. The foam or composite may be oriented, uniaxially or biaxially, in the course of extrusion.

The novel environmentally degradable plastic compositions can also contain non-reactive additives. By the term "non-reactive additive(s)" is meant a modifying additive, filler or reinforcement commonly used in the formulation of plastic compositions which does not materially interfere with the environmental degradation process. For example, the compositions of this invention may contain, in addition to the essential polymer and the readily autoxidizable substance, such additives as lubricants, plasticizers, dyes, pigments, anti-static agents, anti-block agents, slip agents, processing aids, adhesion promotors, flame retardants, particulate fillers, and fibrous reinforcements. In particular, the use of such particulate fillers and reinforcements as calcium carbonate, talc, clays, glass, and mica is contemplated.

Antioxidants and stabilizers may also be utilized in the environmentally degradable compositions of this invention. In some cases, it may be necessary to add an antioxidant or stabilizer to permit high temperature processing, even though such additive may slow the degradation process. In other cases, it may be desirable to retard environmental degradation for a limited period of time. The preferred antioxidant for this purpose is tetrakis[methylene(3,5-di-tert-butyl-4-hydroxyhydrocinnamate)]methane. This composition is sold as IRGANOX 1010 by Ciba-Geigy and disclosed by U.S. Pat. Nos. 3,285,855 and 3,644,482. The antioxidant is used in an amount of about 0.001 to 0.05 percent by weight of the polymer.

It is contemplated that the degradable plastic compositions of this invention will ordinarily contain about 50 to 99.9% by weight of the organic polymer, and about 50% to 0.1% by weight of the readily autoxidizable boron compound. The quantities of any non-reactive additives should not be included in calculating such percentages.

In the best mode contemplated by the inventors, the composition is 99 to 95% by weight low-density polyethylene and 1 to 5% by weight geranyl formate. Low-density polyethylene has a density of less than 0.925 grams per cubic centimeter.

The practice of this invention is particularly suitable for preparing degradable secondary packaging containers, such as holders or wrap for bottles and cans. Examples of such packaging articles are disclosed in the following U.S. Pat. Nos. 3,086,651; 2,874,835; 3,750,876; 3,752,305; 3,747,750; 3,016,182; 3,817,373; 3,084,792; and 3,476,237. All of the foregoing U.S. patents are incorporated by reference into this present patent application.

Reference is made to the drawings and the Figures thereon which represent some of the best mode articles contemplated by the inventors in the practice of this invention. These Figures and description are taken from copending U.S. patent application Ser. No. 694,267, filed June 9, 1976, by James E. Heider and assigned to the same assignee as the instant application. Application Ser. No. 694,267 is incorporated by reference.

Figure 1:
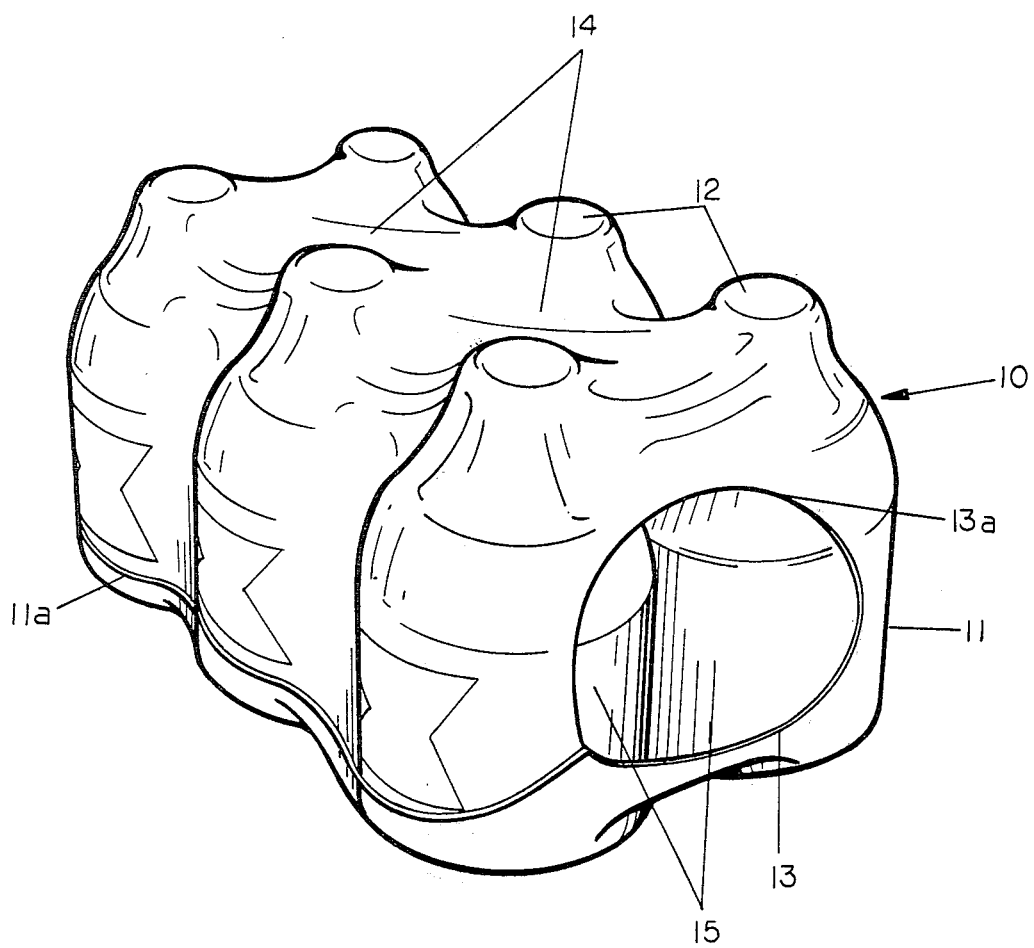
FIG. 1 is a perspective illustration of a "six-pack" of glass bottles packaged in accordance with the present invention.
Figure 2:
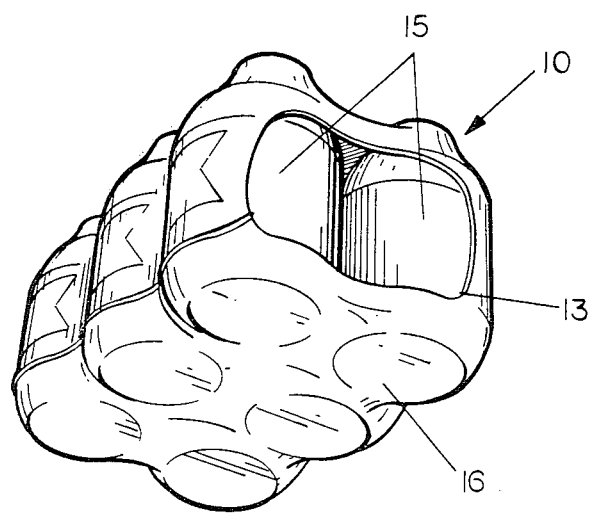
FIG. 2 is a bottom view of the package of FIG. 1.

Referring now to FIGS. 1 and 2 reference numeral 10 generally refers to the cluster package of six conventional upright one-way bottles 15 having similar cylindrical bodies. The containers are arranged in two adjacent rows each having three side-by-side containers.

As can be seen in FIG. 1 the tops 12 of the bottles 15 are snugly engaged by sleeve 11 and the bottles are contained and confined in all directions so as to prevent relative movement of the individual containers within the package. FIG. 2 illustrates how the bottoms 16 of bottles 15 are also snugly engaged by the sleeve. The heat shrunk opaque, overwrap sleeve of the invention is indicated by reference numeral 11 and is applied so that the direction of uniaxial orientation is in the circumferential or radial direction of the sleeve. Sleeve 11 is shown with decoration generally indicated by the letter "X." Such decoration is applied prior to wrapping the sleeve around the package.

The sealing seam of the sleeve is designated by 11a and is shown as being positioned on the lower side of the package. The seam is formed by the use of adhesives or by thermally fusing edges of the sleeve together. The seam is positioned on the side of the package as a matter of convenience and could also be located at the bottom or top of the package.

The open end of the sleeve 11 defines an aperture 13 which is formed as the overlaying ends of the sleeve shrink and fuse together. The other end of the package (not shown) has similar configuration and appearance. In forming aperture 13 there is some shrinkage in the sleeve (e.g. less than 10%) in the axial direction and this assists in the formation of the tight package.

The upper rim 13a of aperture 13 is quite functional and serves as a convenient gripping surface for transporting the package. Due to the nature of the uniaxial orientation, rim 13a is quite strong against the stress of lifting at this point and readily supports the weight of containers and their contents.

To open the package all one need do is punch a hole with the finger or other instrument through the top of the package at point between tops 12 where the sleeve is tightly drawn. Such a point is generally illustrated by reference numeral 14. Once the sleeve is punctured in these areas it will readily tear in the circumferential direction and the bottles can be easily removed individually or in pairs. The sleeve is quite resistant to tearing in the axial direction so the package remains intact with respect to the remaining containers in the cluster.

Figure 3:
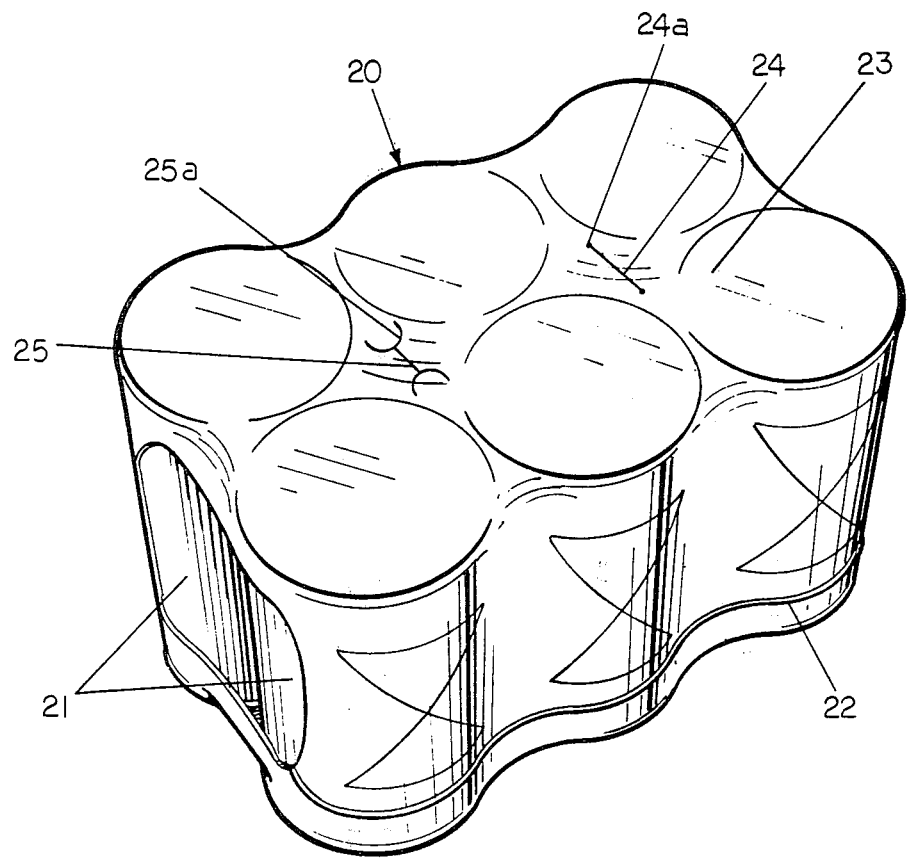
FIG. 3 is a perspective illustration of a six-pack of cans packaged in accordance with the present invention.

FIG. 3 generally illustrates a package 20 similar to that shown in FIGS. 1 and 2, except that the containers are in the form of cylindrical metal cans 21 rather than bottles. The sleeve 23 is otherwise as explained with respect to FIGS. 1 and 2 and is sealed together at seam 22.

FIG. 3 also illustrates how finger opening can be used with the package of invention if desired although the finger hole is not used in the presently preferred embodiment. Reference numeral 25 represents a finger slit which is cut in the circumferential direction on sleeve 23. The slit terminates in semi-circular cuts 25a which serve to retard tearing in the circumferential direction upon carrying. It will be understood that some care must be exercised when carrying the package by finger slits. Reference numeral 24 represents another type of circumferential finger slit which is formed by pushing a hot loop of wire through the sleeve. Slit 24 is sealed by beaded edges 24a which are formed by contact with the hot wire. In practice it is likely that all the slits on one package will be of the same type.

Figure 4:
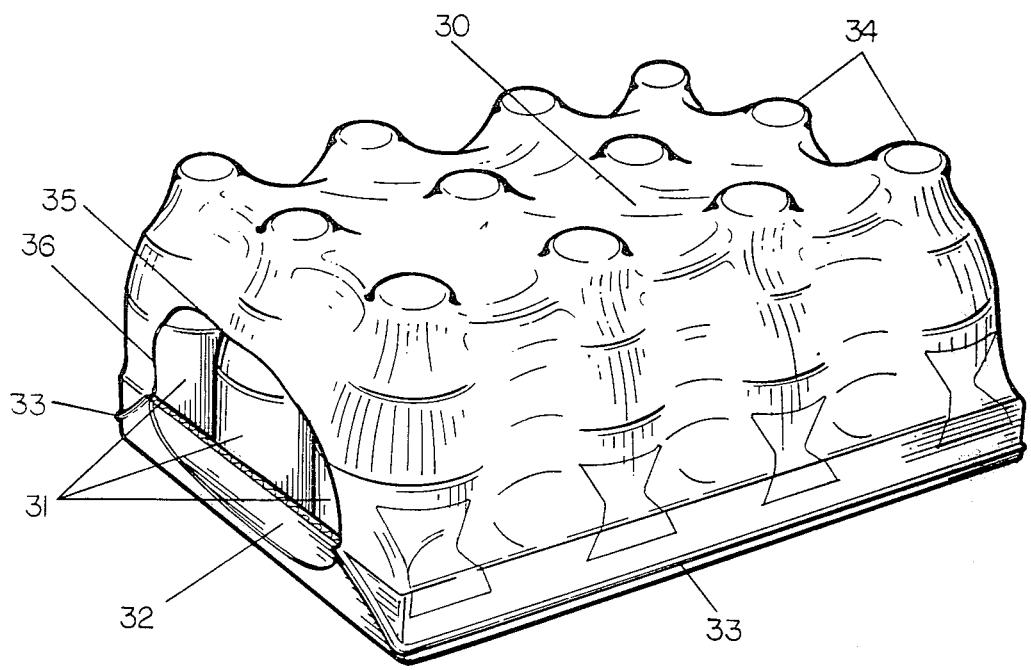
FIG. 4 is a perspective illustration of a 12-pack of glass bottles packaged in accordance with the present invention.

FIG. 4 generally illustrates a 12-pack 30 of one-way bottles arranged in three rows of four bottles each confined by sleeve 30 in tray 32. The package configuration is generally the same for that shown in FIGS. 1 and 2 except that the bottoms of containers 31 are set in tray 32 which is shown as being made of corrugated fiber board. The outline of tray 32 is generally seen under the sleeve 30 and comprises a flat bottom panel provided with short upright side walls on all sides. Tray 32 is used for added package rigidity when more than two rows of containers are packaged to prevent relative displacement of the packaged containers with respect to each other. Due to the use of tray 32 only the tops 34 of the bottles are snugly engaged by sleeve 30 and the bottoms of the containers are held securely against the tray.

Although the article of manufacture of this invention has been described and illustrated in terms of so-called secondary wrap as the best mode, this invention may also be used to make a wide variety of articles including containers, particularly plastic cans and bottles.

We claim:

1. As a composition of matter, an environmentally degradable plastic composition comprising an admixture of a polyolefin and at least one ethylenically unsaturated alcohol or ethylenically unsaturated ester thereof as a readily autoxidizable organic substance substantially uniformly dispersed throughout said polyolefin, said ethylenically unsaturated alcohol or ester being selected from the group consisting of aliphatic alcohols, cycloaliphatic alcohols, heterocyclic alcohols and esters thereof.

2. The invention of claim 1 wherein the degradable plastic composition comprises 50 to 99.99% by weight of the polyolefin and 50 to 0.1% by weight of the autoxidizable ethylenically unsaturated alcohol or ethylenically unsaturated ester.

3. The invention of claim 1 wherein the degradable plastic composition comprises 99 to 95% by weight low-density polyethylene and 1 to 5% by weight geranyl formate.

4. The invention of claim 1 wherein the plastic composition also contains 0.001 to 0.05% by weight antioxidant based on the weight of the polyolefin.

5. The invention of claim 3 wherein the plastic composition also contains 0.001 to 0.05% by weight antioxidant based on the weight of the polyethylene.

6. The invention of claim 5 wherein the antioxidant is tetrakis[methylene(3,5-di-tert-butyl-4-hydroxyhydrocinnamate)]methane.

7. The invention of claim 1 wherein the degradable plastic composition also contains a blowing agent.

8. The invention of claim 1 wherein the polyolefin is selected from polyethylene, polypropylene, poly(4-methyl-1-pentene) and polystyrene.

9. As an article of manufacture, a plastic body of predetermined form and comprising the composition of matter of claim 1.

10. The invention of claim 9 wherein the plastic body comprises 50 to 99.9% by weight of the polyolefin and 50 to 0.1% by weight of the autoxidizable substance.

11. The invention of claim 9 wherein the plastic body comprises 99 to 95% by weight low-density polyethylene and 1 to 5% by weight geranyl formate.

12. The invention of claim 9 wherein the article is a plastic secondary wrap for a container package.

13. The invention of claim 9 wherein the article is of a foamed or cellular plastic body.

14. The invention of claim 9 wherein the hydrocarbon polymer is selected from polyethylene, polypropylene, poly(4-methyl-1-pentene), and polystyrene.

15. A process for preparing an environmentally degradable plastic composition which comprises preparing a composition comprising an admixture of a polyolefin and at least one ethylenically unsaturated alcohol or ester thereof as a readily autoxidizable organic substance substantially uniformly dispersed throughout said polyolefin, said ethylenically unsaturated alcohol or ester being selected from the group consisting of aliphatic alcohols, cycloaliphatic alcohols, heterocyclic alcohols and esters thereof, and subsequently subjecting the prepared composition in the form of an article to an oxidizing environment to partially oxidize said composition.

16. The invention of claim 15 wherein 50 to 99.9% by weight of said polyolefin has dispersed therein 50 to 0.01% by weight of said ethylenically unsaturated alcohol or ester thereof.

17. The invention of claim 15 wherein 99.95% by weight of low density polyethylene has uniformly dispersed therein 1 to 5% by weight geranylformate.

18. The invention of claim 15 wherein 0.001 to 0.05% by weight antioxidant based on the weight of said polyolefin is incorporated in said composition.

19. A method for the production of non-crystalline hydrocarbon soluble ultra high molecular weight drag reducing polymers comprising
  (a) preparing under an inert atmosphere a catalyst comprising;
    (1) titanium trichloride of the general formula $TiCl_3 \cdot nAlCl_3$ wherein n is from 0.00 to 1.0,
    (2) an organoaluminum compound of the general formula $AlR_nX_{3-n}$ wherein R is a hydrocarbon radical containing from 1 to 20 carbon atoms, X is a hydrogen atom or halogen atom, and n varies from 2 to 3,
    (3) a monoether compound of the formula $R_1OR_2$ wherein $R_1$ and $R_2$ are independently aryl, alkyl, aralkyl, or alkaryl, each containing from 1 to 12 carbon carbon atoms and placing the catalyst in contact with
  (b) $C_8$ to $C_{30}$ alpha monoolefinic hydrocarbons at temperatures of from about $-10°$ C. to about $40°$ C., then
  (c) ceasing polymerization at a polymer content level of 20% by weight or less based on the total reaction mixture.

20. The invention of claim 19 wherein said antioxidant is tetrakis[methylene(3,5-di-tert-butyl-4-hydroxyhydrocinnamate)]methane.

21. The invention of claim 15 wherein a blowing agent is incorporated in said composition.

22. The invention of claim 15 wherein said polyolefin is selected from the group consisting of polyethylene, polypropylene, poly(4-methyl-1-pentene) and polystyrene.

23. A process for accelerating environmental degradation of an organic polymeric material comprising dispersing substantially uniformly throughout said polyolefin at least one ethylenically unsaturated alcohol or ester thereof as a readily autoxidizable organic substance to form an admixture comprising said polyolefin and ethylenically unsaturated alcohol or ester thereof to form a composition, said ethylenically unsaturated alcohol or ester being selected from the group consisting of aliphatic alcohols, cycloaliphatic alcohols, heterocyclic alcohols and esters thereof, and subsequently exposing said composition to the natural environment.

24. The invention of claim 23 comprising the further steps of forming said composition into an article of predetermined form and partially oxidizing said composition of said article in an oxidizing environment prior to exposing said composition to the natural environment.

25. The invention of claim 24 wherein said organic polymeric material is a polyolefin.

26. The invention of claim 25 wherein 50 to 0.1% by weight of said ethylenically unsaturated alcohol or ester thereof is dispersed in 50 to 99.9% by weight of said polyolefin.

27. The invention of claim 25 wherein 1 to 5% by weight of geranylformate is dispersed in 99 to 95% by weight of low density polyethylene.

28. The invention of claim 25 wherein 0.001 to 0.05% by weight antioxidant based on the weight of said polyolefin is incorporated in said composition.

29. The invention of claim 27 wherein 0.001 to 0.05% by weight antioxidant based on the weight of said low density polyethylene is incorporated in said composition.

30. The invention of claim 29 wherein said antioxidant is tetrakis[methylene(3,5-di-tert-butyl-4-hydroxyhydrocinnamate)]methane.

31. The invention of claim 25 wherein said polyolefin is selected from the group consisting of polyethylene, polypropylene, poly(4-methyl-1-pentene) and polystyrene.

32. The invention of claim 1 wherein said ethylenically unsaturated alcohol or ethylenically unsaturated ester is selected from the group consisting of geraniol, esters derived from geraniol, linalool, esters derived linalool, citronellol, esters derived from citronellol, allyl alcohol, esters derived from allyl alcohol, crotyl alcohol, esters derived from crotyl alcohol, methallyl alcohol, esters derived methallyl alcohol, farnesol, esters derived from farnesol, furfuryl alcohol, esters derived from furfuryl alcohol, oleyl alcohol, esters derived from oleyl alcohol, ω-undecylenyl alcohol, esters derived from ω-undecylenyl alcohol, geranyl acetate, geranyl formate, geranyl propionate, linalyl acetate, linalyl formate, linalyl propionate, and furfuryl acetate.

33. The invention of claim 9 wherein said ethylenically unsaturated alcohol or ethylenically unsaturated ester is selected from the group consisting of geraniol, esters derived from geraniol, linalool, esters derived linalool, citronellol, esters derived from citronellol, allyl alcohol, esters derived from allyl alcohol, crotyl alcohol, esters derived from crotyl alcohol, methallyl alcohol, esters derived methallyl alcohol, farnesol, esters derived from farnesol, furfuryl alcohol, esters derived from furfuryl alcohol, oleyl alcohol, esters derived from oleyl alcohol, ω-undecylenyl alcohol, esters derived from ω-undecylenyl alcohol, geranyl acetate, geranyl formate, geranyl propionate, linalyl acetate, linalyl formate, linalyl propionate, and furfuryl acetate.

34. The invention of claim 15 wherein said ethylenically unsaturated alcohol or ethylenically unsaturated ester is selected from the group consisting of geraniol, esters derived from geraniol, linalool, esters derived linalool, citronellol, esters derived from citronellol, allyl alcohol, esters derived from allyl alcohol, crotyl alcohol, esters derived from crotyl alcohol, methallyl alcohol, esters derived methallyl alcohol, farnesol, esters derived from farnesol, furfuryl alcohol, esters derived from furfuryl alcohol, oleyl alcohol, esters derived from oleyl alcohol, ω-undecylenyl alcohol, esters derived from ω-undecylenyl alcohol, geranyl acetate, geranyl formate, geranyl propionate, linalyl acetate, linalyl formate, linalyl propionate, and furfuryl acetate.

35. The invention of claim 23 wherein said ethylenically unsaturated alcohol or ethylenically unsaturated ester is selected from the group consisting of geraniol, esters derived from geraniol, linalool, esters derived linalool, citronellol, esters derived from citronellol, allyl alcohol, esters derived from allyl alcohol, crotyl alcohol, esters derived from crotyl alcohol, methallyl alcohol, esters derived methallyl alcohol, farnesol, esters derived from farnesol, furfuryl alcohol, esters derived from furfuryl alcohol, oleyl alcohol, esters derived from oleyl alcohol, ω-undecylenyl alcohol, esters derived from ω-undecylenyl alcohol, geranyl acetate, geranyl formate, geranyl propionate, linalyl acetate, linalyl formate, linalyl propionate, and furfuryl acetate.

* * * * *